(12) United States Patent
Tsukada

(10) Patent No.: US 10,326,901 B2
(45) Date of Patent: Jun. 18, 2019

(54) DETERMINING A SHEET SIZE OF A SHEET ON A SHEET SIZE DETERMINING APPARATUS AND PRINTING APPARATUS

(71) Applicant: CANON KABUSHIKI KAISHA, Tokyo (JP)

(72) Inventor: Nobuyuki Tsukada, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/440,559

(22) Filed: Feb. 23, 2017

(65) Prior Publication Data

US 2017/0257503 A1 Sep. 7, 2017

(30) Foreign Application Priority Data

Mar. 4, 2016 (JP) ................. 2016-042868

(51) Int. Cl.
*H04N 1/00* (2006.01)

(52) U.S. Cl.
CPC ..... *H04N 1/00708* (2013.01); *H04N 1/00734* (2013.01); *H04N 1/00755* (2013.01); *H04N 1/00761* (2013.01); *H04N 2201/0082* (2013.01)

(58) Field of Classification Search
None
See application file for complete search history.

(56) References Cited

U.S. PATENT DOCUMENTS

| 2001/0040684 | A1* | 11/2001 | Takahashi | H04N 1/3935 |
| | | | | 358/1.2 |
| 2012/0188575 | A1* | 7/2012 | Young | G06F 3/1205 |
| | | | | 358/1.13 |
| 2014/0063517 | A1* | 3/2014 | Tachibana | H04N 1/00663 |
| | | | | 358/1.12 |
| 2015/0210494 | A1* | 7/2015 | Takata | G03G 15/502 |
| | | | | 358/1.15 |
| 2015/0235116 | A1* | 8/2015 | Inui | G06K 15/4065 |
| | | | | 358/1.15 |
| 2016/0205271 | A1* | 7/2016 | Nakayoshi | H04N 1/0057 |
| | | | | 358/1.12 |

FOREIGN PATENT DOCUMENTS

JP 2007-8704 1/2007

* cited by examiner

*Primary Examiner* — Neil R McLean
*Assistant Examiner* — Pawan Dhingra
(74) *Attorney, Agent, or Firm* — Venable LLP

(57) ABSTRACT

To provide a sheet size determining apparatus capable of appropriately determining a sheet size. Specifically, a sheet size detection result is acquired by a sensor, and when there are a plurality of candidate sheet sizes corresponding to the acquired detection result, a sheet size is determined from the plurality of candidate sheet sizes in response to a setting of the operation device that indicates sheet sizes.

24 Claims, 11 Drawing Sheets

| SENSOR 110 | SENSOR 111 | SENSOR 112 | SENSOR DETERMINATION | CANDIDATE SHEET SIZE |
|---|---|---|---|---|
| DETECTION | DETECTION | DETECTION | LARGE SHEET | A4, LETTER |
| NON-DETECTION | DETECTION | DETECTION | MIDDLE SHEET | 4"× 6"(10×15cm), POSTCARD |
| NON-DETECTION | NON-DETECTION | DETECTION | SMALL SHEET | L(89×127mm) |

FIG. 3

| SHEET SIZE GROUP | SHEET SIZE INCLUDED IN GROUP |
|---|---|
| GROUP 303 | LETTER, 4"x 6"(10x15cm) |
| GROUP 304 | A4, POSTCARD, L(89x127mm) |

FIG. 6

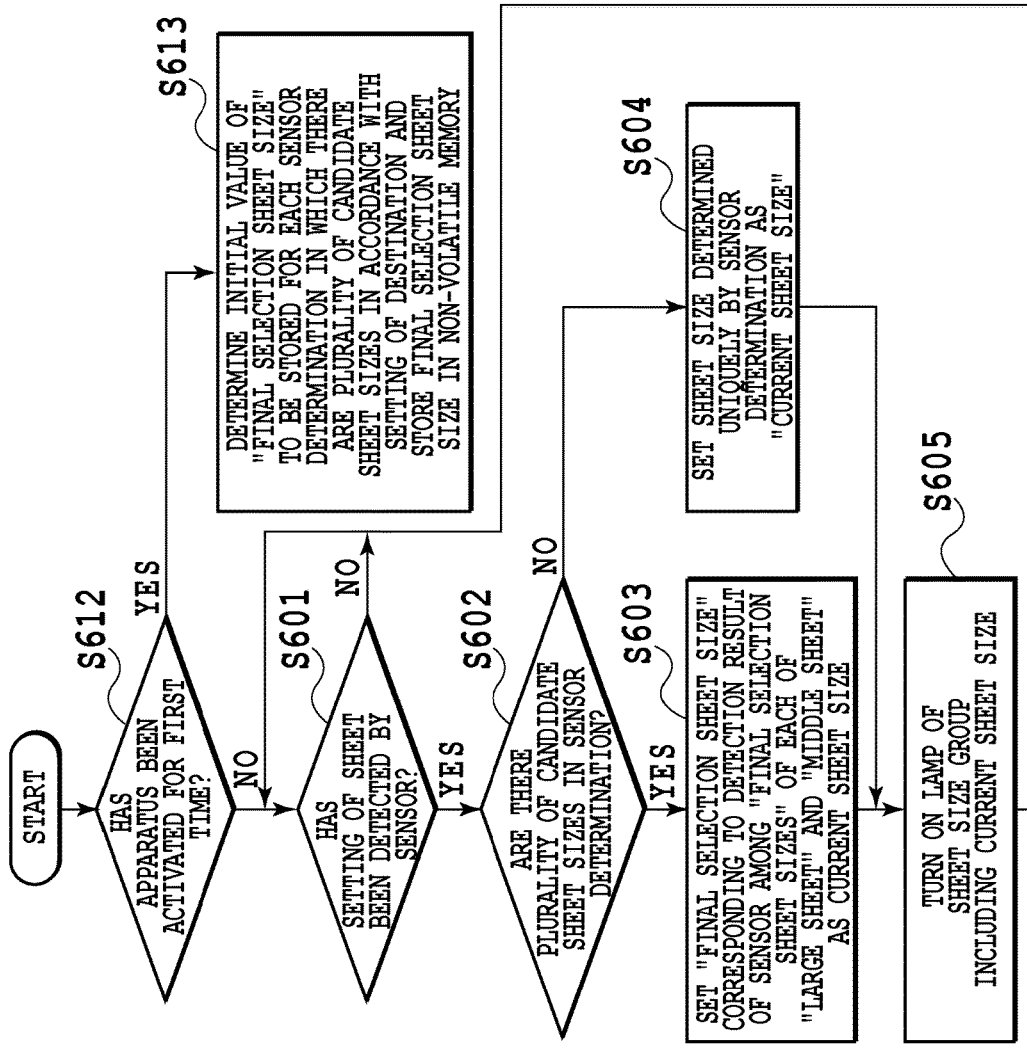

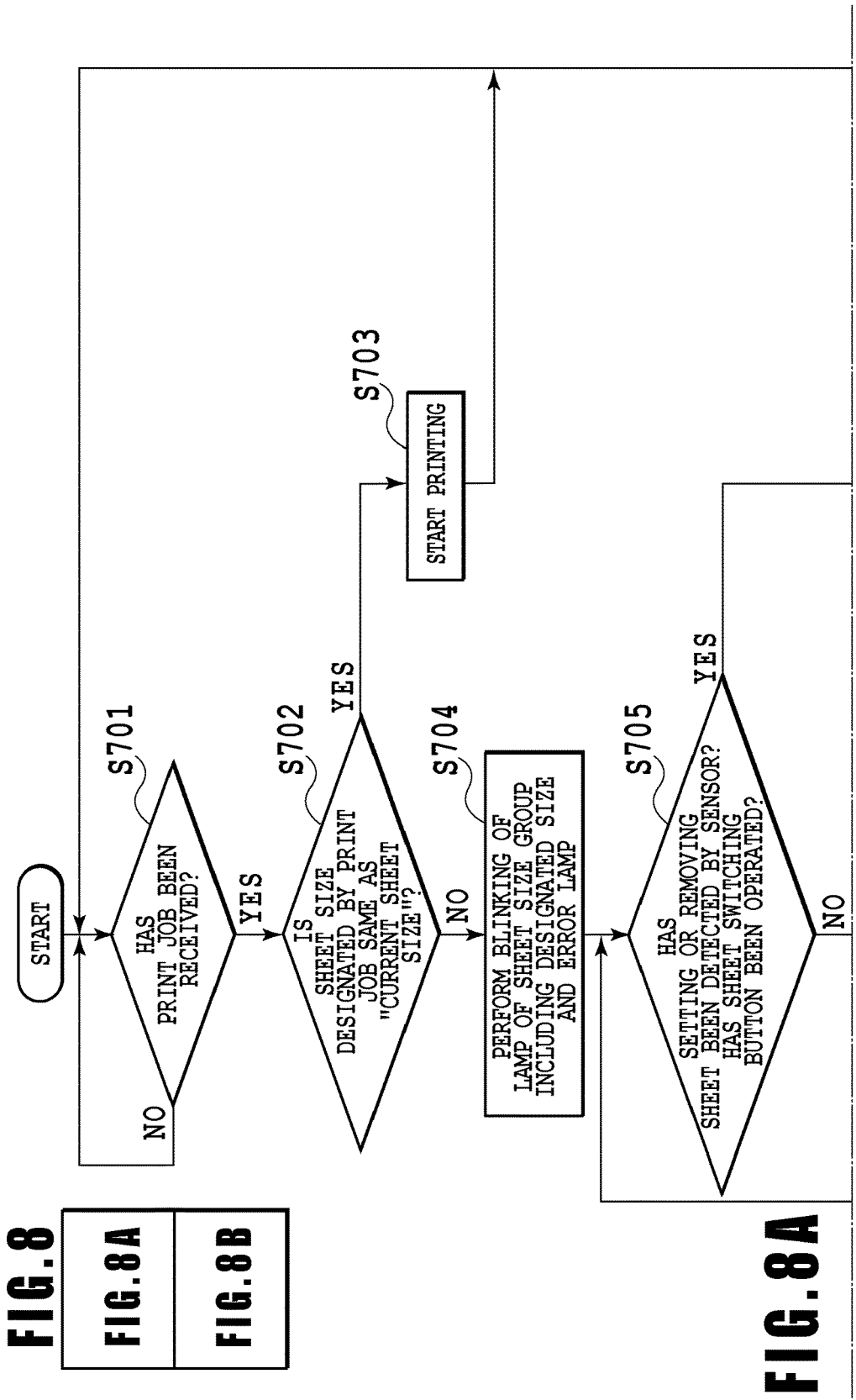

DETERMINING A SHEET SIZE OF A SHEET ON A SHEET SIZE DETERMINING APPARATUS AND PRINTING APPARATUS

BACKGROUND OF THE INVENTION

Field of the Invention

The present invention relates to a sheet size determining apparatus which is used in a printing apparatus or the like to determine a size of a sheet on the basis of a detection result of a sensor.

Description of the Related Art

There is known a printing apparatus which automatically detects a size of a sheet set on a print sheet feeding unit.

Japanese Patent Laid-Open No. 2007-8704 describes a device which detects a size of a sheet set on an auto-sheet feeder by an optical sensor.

However, even when the size of the sheet can be detected by a configuration of the sensor as described in Japanese Patent Laid-Open No. 2007-8704, the detected sheet may be any one of sheets such as an A4 size and a letter size, whose size are not distinguished from each other by the sensor. In such a case, the sheet size cannot be uniquely determined.

SUMMARY OF THE INVENTION

An object of the present invention is to provide a sheet size determining apparatus capable of appropriately determining a sheet size.

In a first aspect of the present invention, there is provided a sheet size determining apparatus that determines a sheet size based on a detection result of a sensor, the sheet size determining apparatus comprising: an acquisition unit configured to acquire a sheet size detection result obtained by the sensor; and a determination unit configured to, in a case where there is a plurality of candidate sheet sizes corresponding to the detection result acquired by the acquisition unit, determine a sheet size in the plurality of candidate sheet sizes in accordance with a setting in an operation device that indicates sheet sizes.

In a second aspect of the present invention, there is provided a sheet size determining apparatus that determines a sheet size based on a detection result obtained by a plurality of sensors, the sheet size determining apparatus comprising: an operation panel configured to indicate a plurality of sheet size groups in which a plurality of sheet sizes corresponding to the same detection result obtained by a plurality of the sensors exist.

In a third aspect of the present invention, there is provided a printing apparatus capable of determining a sheet size of a sheet set in the printing apparatus, based on a detection result obtained by a sensor, the printing apparatus comprising: an acquisition unit configured to acquire a sheet size detection result obtained by the sensor; and a determination unit configured to, in a case where there is a plurality of candidate sheet sizes corresponding to the detection result acquired by the acquisition unit, determine a sheet size in the plurality of candidate sheet sizes in accordance with a setting in an operation device that displays sheet sizes.

According to the present invention, a sheet size can be appropriately determined.

Further features of the present invention will become apparent from the following description of exemplary embodiments with reference to the attached drawings.

BRIEF DESCRIPTION OF THE DRAWINGS

FIG. 3 is a diagram illustrating a correlation table between a candidate sheet size and a detection result of a sensor of the printing apparatus of the embodiment;

FIG. 6 is a diagram illustrating a sheet size group and a sheet size table included in the group;

FIG. 7 is a diagram showing the relationship of FIGS. 7A and 7B;

FIG. 7A is a flowchart illustrating a sheet size determining control;

FIG. 8 is a diagram showing the relationship of FIGS. 8A and 8B;

FIG. 8A is a flowchart illustrating a control in the event of a sheet mismatch error of the printing apparatus;

DESCRIPTION OF THE EMBODIMENTS

Hereinafter, embodiments of the present invention will be described in detail with reference to the drawings.

First Embodiment

In the embodiment, a printing apparatus capable of printing an image on a print sheet will be described as an example of a sheet size determining apparatus which determines a sheet size of the print sheet.

Figure 1:
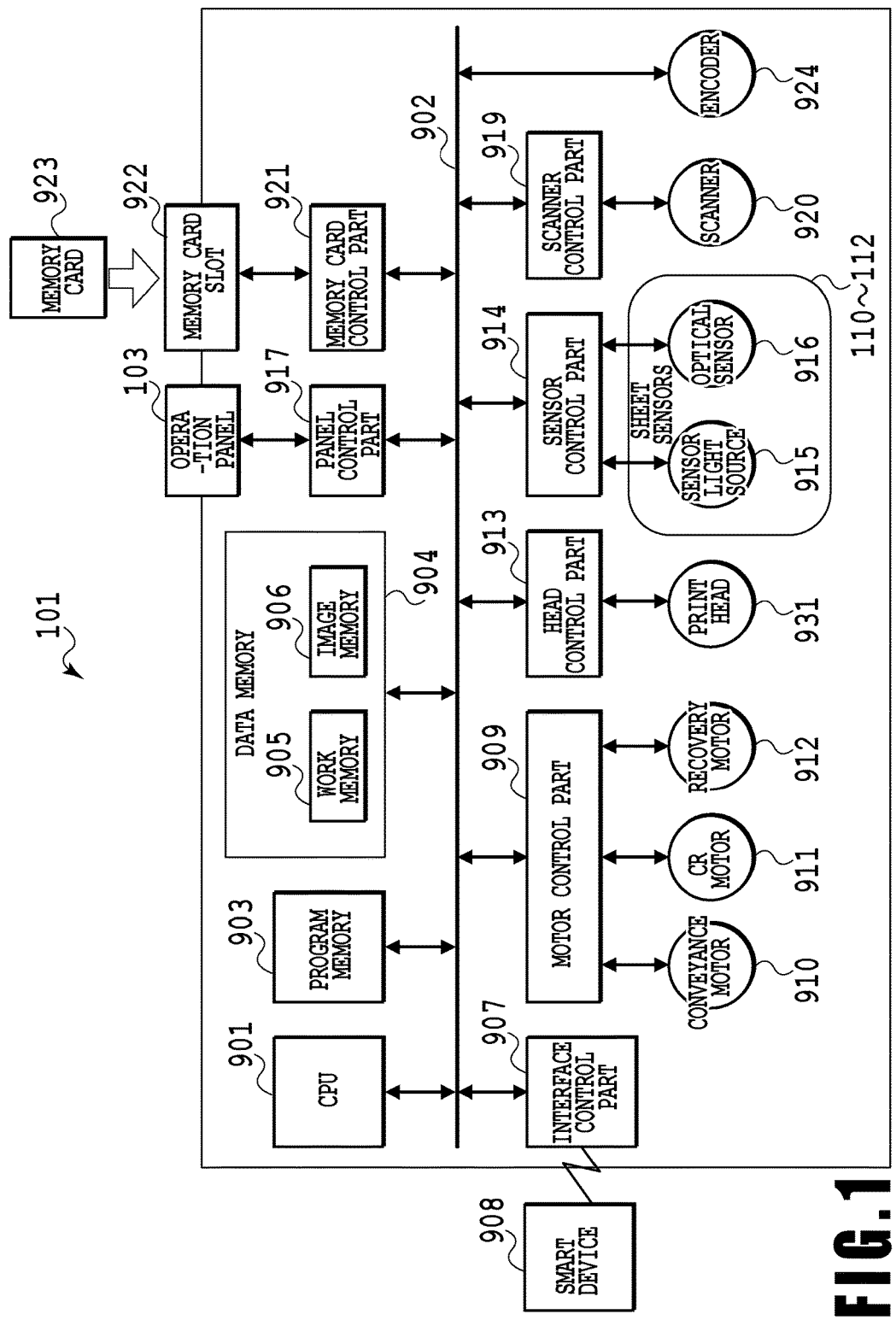
FIG. 1 is a block diagram illustrating a configuration of a printing apparatus according to an embodiment.

FIG. 1 is a block diagram illustrating a configuration of a printing apparatus 101 according to an embodiment of the present invention.

A CPU 901 is a processor that controls the printing apparatus 101. The CPU 901 is connected to a program memory 903 such as a ROM and a hard disk and a data memory 904 such as a RAM via an internal bus 902. The program memory 903 stores a program for controlling the printing apparatus 101. More specifically, the CPU 901 can control the printing apparatus 101 by reading a program stored in the program memory 903, loading the program onto the data memory 904, and executing the program on a work memory 905 allocated to the data memory 904. Further, an image memory 906 can be also allocated to the data memory 904 and various data such as image data to be printed by the printing apparatus 101 is developed on the image memory 906 by the CPU 901.

An interface control part 907 communicates with a smart device 908 such as a smart phone via an interface under the control of the CPU 901. For example, the interface control part can receive a print job of a printing object from the smart device 908 and notify status information of the printing apparatus 101 to the smart device 908. Additionally, the interface control part 907 may perform a communication via a wired interface such as a USB (Universal Serial Bus) cable or a wireless interface such as an infrared communication or a wireless LAN. Additionally, the smart device may be, for example, a smart phone or a tablet and includes various devices such as a cellular phone.

Further, a device with which the printing apparatus 101 communicates is not limited to the smart device 908, but may be a personal computer. Other device may be a server connected via a network, a facsimile connected via a phone line, or a digital TV. Further, the present invention is not limited to a case in which a print job includes data of a printing object. For example, the printing apparatus 101 may acquire data of a printing object from an external device such as a server in accordance with address information included in a print job.

A motor control part 909 controls various motors for driving a printing mechanism of the printing apparatus 101 under the control of the CPU 901. Specifically, a conveyance motor 910 drives a sheet feeding roller (not illustrated), a conveying roller (not illustrated), and a sheet discharging roller (not illustrated) constituting a sheet conveying mechanism of the printing apparatus of the embodiment in accordance with the control of the motor control part 909. Further, a carriage motor 911 (a CR motor) drives a carriage (not illustrated) equipped with a print head 931 in accordance with the control of the motor control part 909 so that the carriage moves in a reciprocating manner. Thereby, the print head 931 can scan a sheet. Further, the recovery motor 912 drives a head recovery mechanism (not illustrated) in accordance with the control of the motor control part 909.

A head control part 913 controls the print head 931 in accordance with the control of the CPU 901 to eject a printing material such as ink from the print head 931. The CPU 901 performs driving of both the print head 931 and the conveyance motor 910 so that an image is printed on a print sheet while the print head 931 scans the print sheet. More specifically, the CPU 901 inside the printing apparatus 101 serves as a printing control device and controls the print head 931 and various motors serving as a printing mechanism so that an image is printed by the printing mechanism.

A sensor control part 914 causes each of sensor light sources respectively included in sensors 110 to 112 to be described later in FIG. 2 to emit light in accordance with the control of the CPU 901 and performs detection of receiving of reflected light by optical sensors respectively included in the sensors 110 to 112. For example, the sensor control part 914 acquires an output level representing the intensity of the light received by the optical sensor. The CPU 901 inputs an output level, which is acquired by the sensor control part 914, for each of the optical sensors respectively included in the sensors 110 to 112. Thereby, the CPU 901 can specify the sensor which receives the light reflected from the print sheet among the sensors 110 to 112. Then, the CPU 901 can determine a size of the print sheet in response to the specified sensor. The determining process will be described later in detail in FIGS. 7A and 7B.

A panel control part 917 controls a detection of an input to an operation panel 103 and turning on and turning off of a lamp as will be described later in FIGS. 2, 4, 5, and 7 in accordance with the control of the CPU 901. Additionally, the operation panel 103 includes an operation device such as a key (button) which is operated by the user and a lamp which shows information on a sheet size. For example, when the user operates the key (button) of the operation panel 103, an instruction of the user is input to the panel control part 917 and the instruction is further input to the CPU 901. Further, the panel control part 917 can turn on the lamp in response to the instruction of the CPU 901.

A scanner control part 919 controls a scanner 920 in accordance with the control of the CPU 901 to read a document placed on a document plate of the scanner 920 and inputs the read image thereto. Further, the scanner control part 919 controls the read image to be stored in the image memory 906. A memory card control part 921 writes various data into a memory card 923 attached to a memory card slot 922 or reads various data therefrom in accordance with the control of the CPU 901.

An encoder 924 specifies a position of the carriage when the carriage moves along a guide rail (not illustrated).

Further, the printing apparatus 101 includes a sheet feeding tray described below in FIG. 2.

Figure 2:
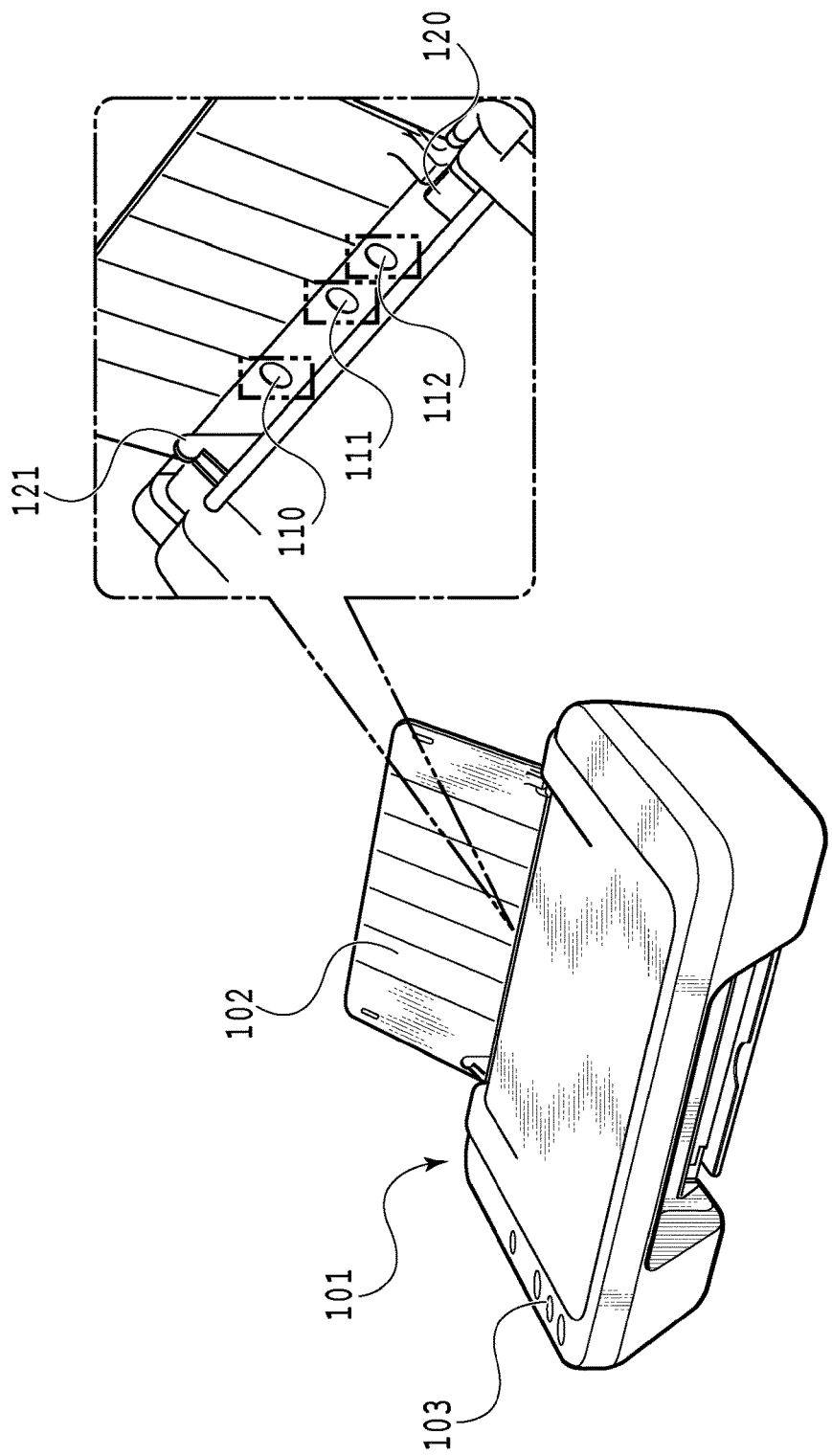
FIG. 2 is a view illustrating an appearance of the printing apparatus of the embodiment.

FIG. 2 is a diagram illustrating an appearance of the printing apparatus of the embodiment. The printing apparatus 101 includes a sheet feeding tray 102 on which a user sets print sheets (for feeding the print sheet) and the operation panel 103 which is operated by the user.

The sheet feeding tray 102 is provided with a fixed guide plate 120 which serves as a position reference and as a guide for setting a sheet and is provided at the end portion of the sheet feeding tray in the width direction of the sheet set on the sheet feeding tray. On the other hand, the other end portion thereof in the width direction is provided with a guide plate 121 which is movable in the sheet width direction. When the user grips a knob provided in the guide plate 121 and moves the guide plate 121 so that the set sheet is pushed to the reference guide plate 120, a sheet feeding position can be set.

The optical sheet sensor units 110, 111, and 112 are respectively provided at positions determined with reference to the position of the guide plate 120 which is used as the sheet setting reference. Accordingly, as will be described later in FIG. 3 and the like, a determination on a candidate sheet size can be performed on the basis of a combination of detection results of three sensors.

Additionally, the above-described example corresponds to a case where the sheet is set based on a reference position corresponding to one side of the sheet feeding tray, but the reference position may be set to a so-called center reference position. In that case, one of two guide plates is moved and the other thereof is also moved in response to the moving of the one of two guide to interpose a sheet therebetween. In this way, a sheet position can be set at a center position of the sheet feeding tray. In this configuration, a positional relation of three sensors is, of course, set by the positions obtained by the combination of the detection results of three sensors described in FIG. 3. Additionally, FIG. 2 schematically illustrates the sheet sensor unit.

Each of the sheet sensor units 110, 111, and 112 includes a light source and an optical sensor. As for each of the sheet sensor units, if a sheet covers the sheet sensor unit when the user sets the sheet on the sheet feeding tray 102, light which is emitted from the light source and is reflected from the sheet is received by the optical sensor. Then, it is possible to determine whether the sheet exists on the sheet sensor unit by checking whether the optical sensor receives light having a predetermined value or more of intensity that is regarded as light reflected from the sheet. The CPU 901 determines the size of the sheet by determining which sheet sensor unit detects that the sheet exists thereon among the sheet sensor units 110, 111, and 112, that is, determining which sheet sensor unit detects the light having the predetermined value or more of intensity. Hereinafter, the determining method will be described below.

FIG. 3 is a diagram illustrating a relation between a detection result obtained by three sheet sensor units and a candidate sheet size determined in response to the detection result. As illustrated in FIG. 3, when all of the sheet sensor units 110, 111, and 112 detect the existence of the sheet, the sheet is roughly determined as a "large sheet." Then, the CPU 901 determines that a candidate of the size of the sheet set on the sheet feeding tray is an A4 size or a letter size. Further, when only the sensors 111 and 112 detect the existence of the sheet, the sheet is roughly determined as a "middle sheet." Then, the CPU 901 determines that a candidate of the size of the sheet set on the sheet feeding tray is a size of 4×6 inch or a postcard size. Furthermore, when only the sensor 112 detects the existence of the sheet, the sheet is roughly determined as a "small sheet." Then, the CPU 901 determines that the candidate of the size of the sheet set on the sheet feeding tray is an L size. In the case of the small sheet, since only one size is provided in the embodiment, there is only one candidate sheet size and thus the size of the sheet can be specified uniquely.

In this way, in the case that the sheet size is roughly determined as the "large sheet" or the "middle sheet", a plurality of candidates exist as the candidate sheet sizes. In this case in which there are a plurality of candidate sheet sizes, in the embodiment, the CPU 901 then determines the sheet size uniquely among these candidates on the basis of the operation of the user for the operation panel 103. Hereinafter, this process will be described in detail.

Figure 4:
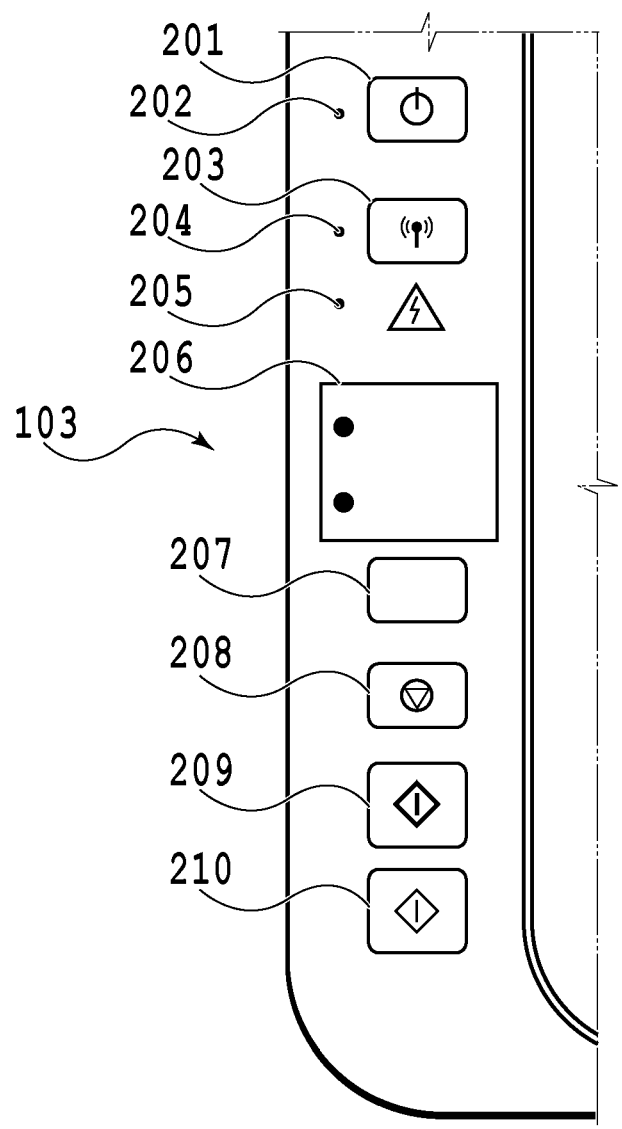
FIG. 4 is a view illustrating an operation panel of the printing apparatus of the embodiment.

FIG. 4 is a view illustrating a configuration of the operation panel 103 according to the embodiment.

The operation panel 103 includes a power button 201 which is used for power-on and power-off of the printing apparatus 101 and a power lamp 202 which is turned on when power is supplied to the printing apparatus. Further, the operation panel includes a Wi-Fi button 203 which enables or disables a Wi-Fi function serving as a radio communication and a Wi-Fi lamp 204 which is turned on when the Wi-Fi function is enabled. Further, the operation panel includes an error lamp 205 which is turned on when a predetermined error occurs in the printing apparatus 101.

Additionally, the operation panel 103 includes a sheet setting indication part 206 which allows the user to give an instruction in the sheet size determining process and a sheet switching button 207. The sheet setting indication part 206 and the sheet switching button 207 will be described later in detail in FIG. 5. Further, the operation panel 103 includes a stop button 208 for stopping a printing process, a start button (for color) 209 for giving an instruction for a color printing process, and a start button (for monochrome) 210 for giving an instruction for a monochrome printing process.

Figure 5:
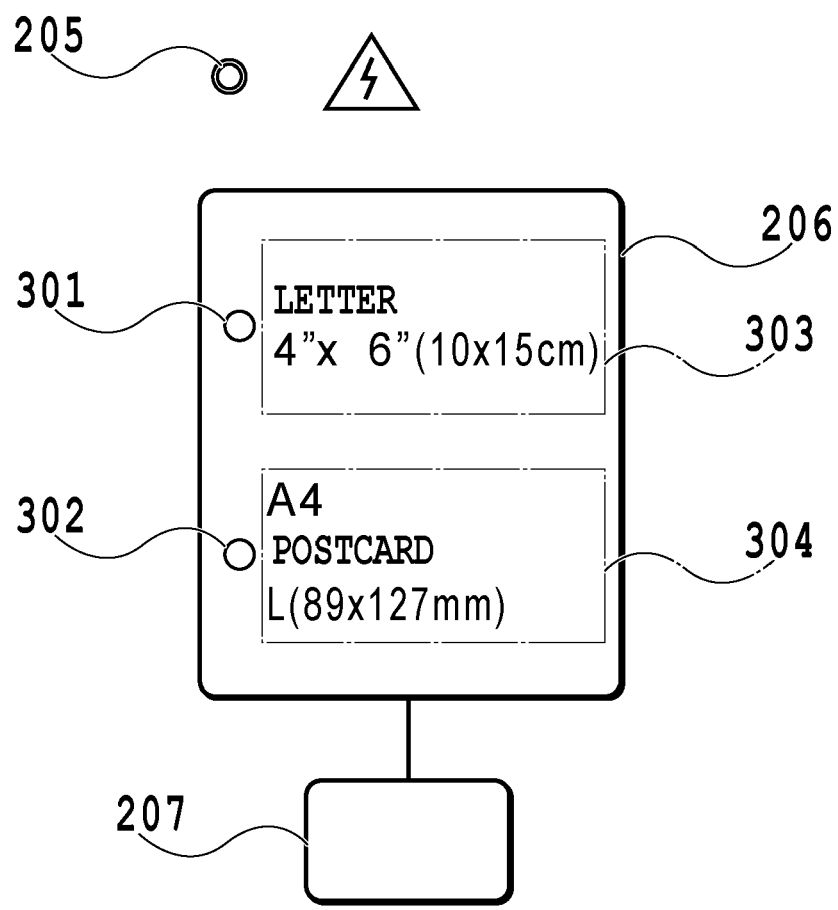
FIG. 5 is a view illustrating a sheet selection unit of the operation panel of the printing apparatus of the embodiment.

FIG. 5 is a view specifically illustrating the error lamp 205, the sheet setting indication part 206, and the sheet switching button 207 illustrated in FIG. 4. As shown by the one-dotted chain line areas in FIG. 5, the sheet sizes are grouped in accordance with combinations of the candidate sheet sizes included in respective the "large sheet", the "middle sheet", and the "small sheet." Specifically, a sheet size group 303 having a combination of a letter size and a size of 4×6 inch and a sheet size group 304 having a combination of an A4 size, a postcard size and an L size are separately provided. As understood from FIG. 3, these groups are provided such that two size candidates in each of three candidate sheet sizes shown in FIG. 3 respectively exist in different groups (303 and 304). Accordingly, when the user selects any one of these groups, the size of the sheet can be determined uniquely by a combination of the detect results of three sensors.

Additionally, the indication of the sheet setting indication part 206 is printed on the surface of the sheet setting indication part 206 in advance, but may be displayed on the display panel if necessary.

Further, in the sheet setting indication part 206, Reference Numeral 301 indicates a sheet size group lamp which can show that the sheet size group 303 is active and Reference Numeral 302 indicates a sheet size group lamp which can show that the sheet size group 304 is active. The sheet switching button 207 is a button for switching the sheet size group.

FIG. 6 is a diagram illustrating the sheet size group. In the examples illustrated in FIGS. 3 and 5, the sheet size group 303 and the sheet size group 304 illustrated in FIG. 6 are separately provided. The user can select the group 303 or the group 304 by pressing the sheet switching button 207. A lamp which corresponds to a selected group is turned on among the lamps 301 and 302.

Figure 7B:
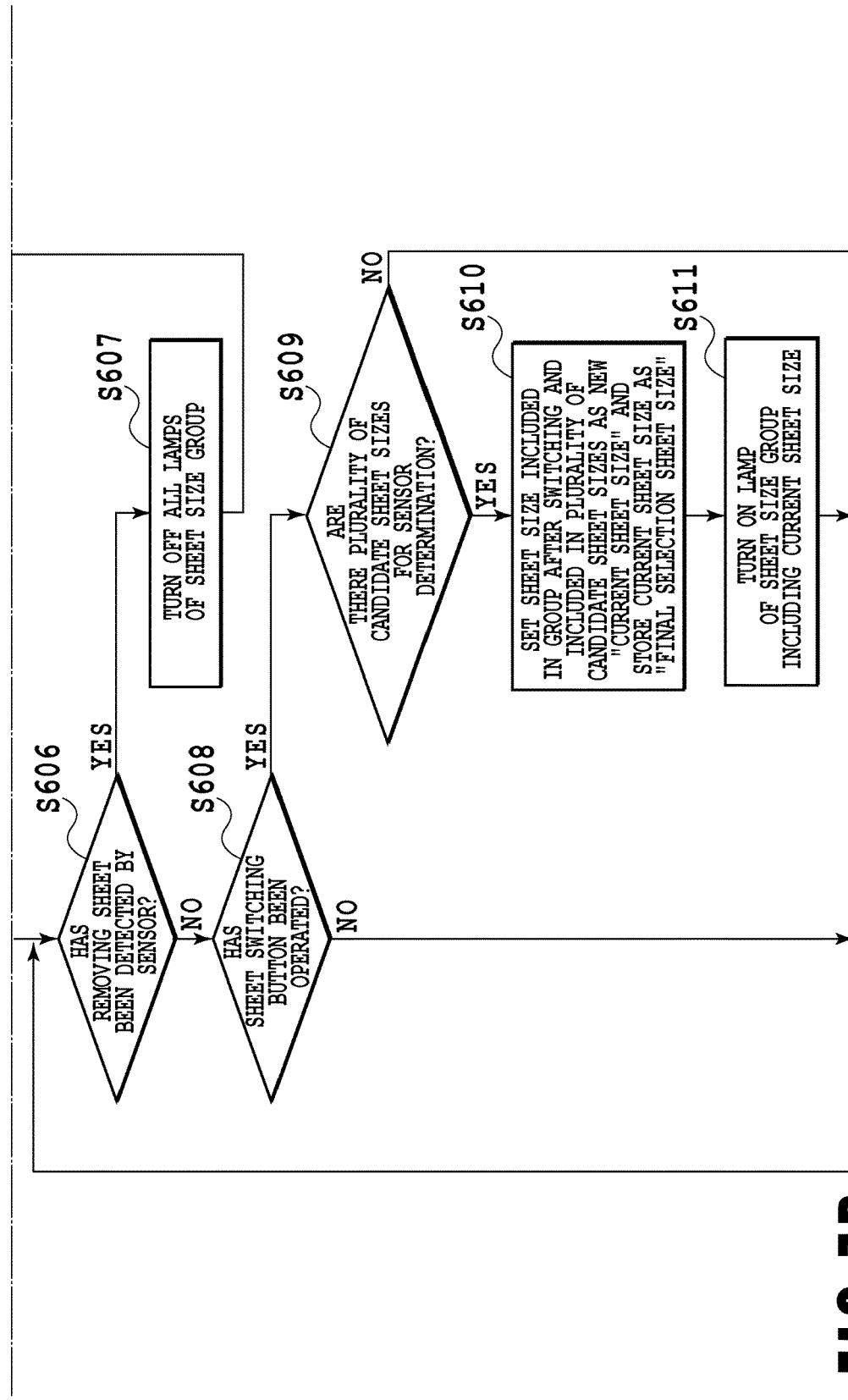
FIG. 7B is a flowchart illustrating a sheet size determining control.

FIGS. 7A and 7B are flowcharts illustrating a process of determining the size of the sheet set on the sheet feeding tray according to the embodiment.

The process illustrated in FIGS. 7A and 7B is performed when the printing apparatus 101 is activated. The printing apparatus 101 stores "final selection sheet size" which is finally selected by the user through the selection of the group 303 or 304 illustrated in FIG. 5 for each of the large sheet and the middle sheet, and which is determined by the sheet sensor unit, in a non-volatile memory (the program memory 903 or the like) of the apparatus body. Specifically, the "A4 size" or the "letter size" is stored as the "final selection sheet size" corresponding to the large sheet and the "size of 4×6 inch" or the "postcard size" is stored as the "final selection sheet size" corresponding to the middle sheet.

It should be noted that the "final selection sheet size" is not stored when the printing apparatus 101 is activated for the first time. Therefore, in STEP 612, the CPU 901 determines whether the printing apparatus 101 is activated for the first time. In the case of the first activation, in STEP 613, the CPU 901 stores an initial value of the "final selection sheet size" in the non-volatile memory (the program memory 903 or the like) in accordance with the setting of a destination set in the printing apparatus 101 in advance. Here, since the sheet size is set uniquely in the case of the small sheet (size: L), the "final selection sheet size" corresponding to the small sheet may not be stored.

All lamps of the sheet size groups are turned off in a state where the sheet is not set on the apparatus. When the sheet is just set on the sheet feeding tray in this state, the sheet sensor unit detects the sheet (Yes in STEP 601). Then, when the CPU 901 determines that the determination result corresponds to a plurality of candidate sheet sizes (the large sheet and the middle sheet) (Yes in STEP 602), a process proceeds to STEP 603. In STEP 603, the CPU 901 specifies a sheet among the "large sheet" and the "middle sheet" on the basis of the detection result obtained by the sensors. Then, the CPU 901 reads the "final selection sheet size" which is stored in the non-volatile memory and corresponds to the specified detection result (the large sheet or the middle sheet) and sets it as a determination sheet size (hereinafter, referred to as a current sheet size) that is finally determined uniquely. For example, it is assumed that the user selects the group 303 illustrated in FIG. 5 in advance before the print sheet is set on the printing apparatus 101. In this case, as illustrated in FIGS. 5 and 6, the "final selection sheet size" corresponding to the large sheet is the "letter size" and the "final selection sheet size" corresponding to the middle sheet is the "size of 4×6 inch." Thus, in STEP 603, when a combination of the detection results of the sensors corresponds to the "large sheet", the CPU 901 reads the letter size which is the "final selection sheet size" corresponding to the large sheet. This size is set as the current sheet size. Next, the lamp of the sheet size group including the current sheet size is turned on (STEP 605).

Meanwhile, when the detection result of the sheet sensor unit specifies the sheet size uniquely (the small sheet size), the CPU 901 sets the corresponding sheet size (L) as the current sheet size (STEP 604). Then, the lamp corresponding to the sheet group (in this case, the group lamp 302) is turned on (STEP 605).

When the CPU 901 detects a removing the sheet set on the sheet feeding tray 102 by the sheet sensor unit (Yes in STEP 606), the CPU 901 turn off the lamp of the sheet size group (STEP 607) and causes the routine to return to a state before the setting of the sheet (STEP 601).

When the sheet switching button 207 is operated while the sheet is set (Yes in STEP 608), the CPU 901 determines whether a state having a plurality of candidate sheet sizes (the large sheet and the middle sheet) exist or a state in which the candidate sheet size is determined uniquely (the small sheet) (STEP 609). In the former state, in STEP 610, the CPU 901 sets a candidate sheet size included in a plurality of candidate sheet sizes and included in a group selected from the group 303 and the group 304 illustrated in FIGS. 5 and 6, as the current sheet size. For example, as in the above-described example, a case is assumed such that the determination result obtained by the sheet sensor unit is the "large sheet", the group selected before the sheet switching button is operated is the group 303, and the current sheet size is the letter size. In this case, in STEP 610, the A4 size which is the sheet size included in the group 302 which is a group after the sheet switching button is operated and included in the candidate sheet size (the A4 size and the letter size) is set as the current sheet size.

Then, the CPU 901 stores a new current sheet size among the "large sheet" and the "middle sheet" as a "final sheet setting size" corresponding to the current sheet size and selectively turns on the lamp (STEP 611). At this time, the "final sheet setting size" corresponding to the other size among the "large sheet" and the "middle sheet" is not changed.

Figure 8B:
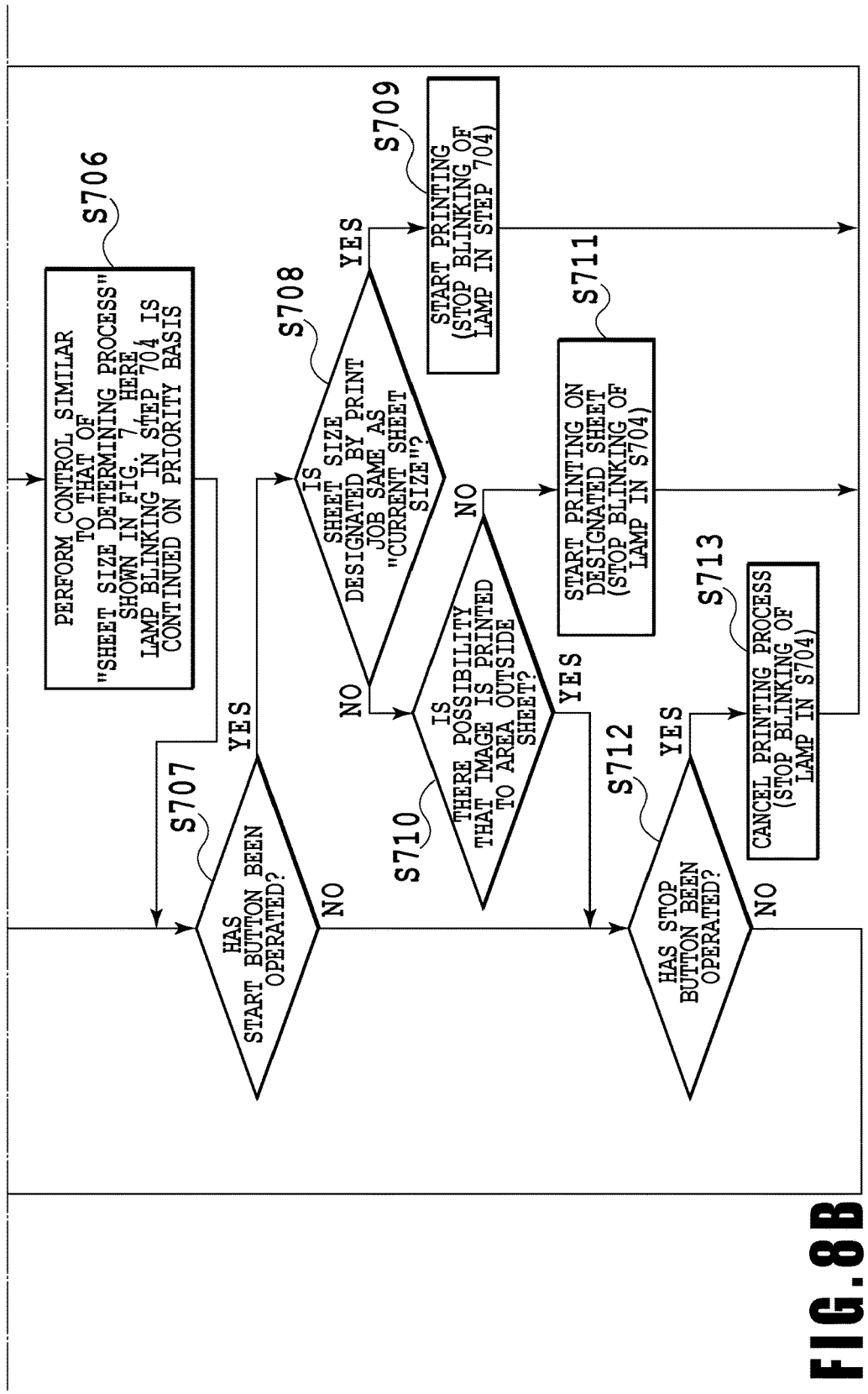
FIG. 8B is a flowchart illustrating a control in the event of a sheet mismatch error of the printing apparatus.

FIGS. 8A and 8B are flowcharts illustrating a control by the printing apparatus when the printing apparatus receives a print job from a host device such as a PC or a smart phone in the embodiment. It should be noted that the current sheet size at this time is stored in the program memory 903 or the like.

When the CPU 901 receives a print job from the host device (Yes of STEP 701), it is determined whether the current sheet size corresponding to the size of the sheet set on the sheet feeding tray 102 is same as the sheet size designated by the print job (STEP 702). When it is determined that both sheet sizes match each other, the CPU 901 starts a process of printing an image corresponding to the print job by a printing part of the printing apparatus 101 (STEP 703).

Meanwhile, when the CPU 901 determines that both sheet sizes do not match each other in STEP 702, it is determined that a "sheet mismatch error" occurs and the error lamp 205 and the sheet size group lamp (301 or 302) corresponding to the sheet size designated by the print job are made to blink (STEP 704).

Accordingly, it is possible to notify information on whether the sheet group needs to be switched by the sheet switching button to the user.

Next, the CPU 901 determines whether one of a case that the user removes the sheet from the sheet feeding tray (the sheet sensor unit detects a sheet removed state), a case that the sheet sensor unit detects the setting of the sheet, or a case that the sheet switching button 207 is operated (STEP 705) occurs.

When it is determined that any one of the above-described cases occurs, the CPU 901 performs the sheet size determining process illustrated in FIGS. 7A and 7B (STEP 706). Here, the error lamp and the group lamp of STEP 704 are continued to blink on a priority basis in a state where the sheet mismatch error of STEP 704 occurs (STEP 706). For example, when the user selects a group which corresponds to a group lamp different from a blinking group lamp of a group (a group of a designated size), the selected group lamp is turned on while the blinking is continued. Further, when the user selects a group which corresponds to the same group lamp as the blinking group lamp of the group (a group of a designated size), the lamp may blink while not being turned on continuously.

When the CPU 901 detects an operation of the start button (208 or 210) in this state, it is determined whether the current sheet size matches the sheet size designated by the print job again (STEP 708). When both sheet sizes match each other, the CPU 901 cancels the sheet mismatch error (stops the blinking of the lamp) and starts the printing process (STEP 709). When both sheet sizes do not match each other, the CPU 901 determines whether an image may be printed to an area beyond the sheet by comparing the printing areas of the current sheet size and the size designated by the print job. In the process of FIGS. 8A and 8B, the CPU 901 performs printing of an image at an equal magnification in response to the size designated by the print job. For that reason, for example, when the current sheet size is smaller than the designated size, it is determined that an image is printed to an area beyond the sheet.

When it is determined that an image is printed to an area outside the sheet, an error is not canceled and the process proceeds to STEP 712. In STEP 712, the CPU 901 determines whether the stop button (210) is operated. Then, when the operation is detected, the job is canceled and the printing process is not performed (an error is also canceled) (STEP 713).

Meanwhile, in STEP 710, when it is determined that an image is not printed to an area outside the sheet, the CPU 901 cancels an error and performs printing of data of a size designated by a print job on a currently set sheet (STEP 711).

Second Embodiment

Figure 9:
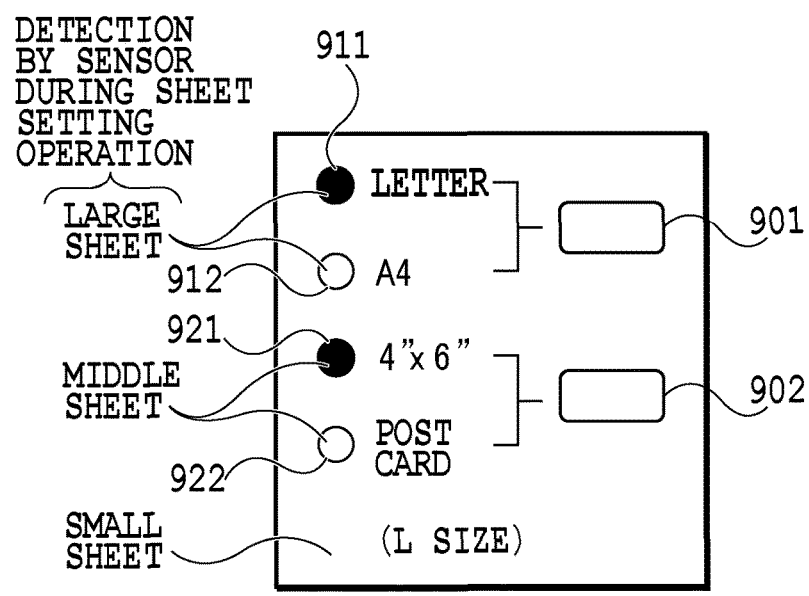
FIG. 9 is a view illustrating the sheet selection unit of the operation panel.

FIG. 9 is a view illustrating a sheet setting indication part 206 according to a second embodiment of the invention.

As described above in the first embodiment, when a sheet is set on the sheet feeding tray 102, three levels of determination are made by the sensor units provided in the sheet feeding tray in order to determine whether a set sheet is the large sheet, the middle sheet, or the small sheet. However, the letter size and the A4 size cannot be distinguished from each other in the case of the determination of the large sheet and the size of 4×6 inch and the postcard size cannot be distinguished from each other in the case of the determination of the middle sheet. Additionally, the L size can be specified only in the case of the determination of the small sheet.

Therefore, the operation panel of the embodiment includes lamps 911, 912, 921, and 922 which show what size of the sheet is selected among candidate sheet sizes in each of groups when the sensor unit determines that a current sheet is the large sheet or the middle sheet, and also includes switching buttons 901 and 902. Additionally, since the L size is determined uniquely in the case of the determination of the small sheet, a lamp or a button thereof is not provided.

Additionally, in FIG. 9, when a size of 10×15 cm also corresponds to the "small sheet", lamps and a switching button may be further provided to correspond to the L size and the size of 10×15 cm as the size candidate.

In the example of FIG. 5, the user selects the sheet size through the selection of a combination 303 (the letter size, the size of 4×6 inch, and the size of 10×15 cm) or a combination 304 (the A4 size, the postcard size, and the L size) of the sheet sizes respectively included in the "large sheet", the "middle sheet", and the "small sheet." Meanwhile, in FIG. 9, the switching button (901, 902) is provided for each of the "large sheet" and the "middle sheet" and thus the sheet size can be separately selected.

In FIG. 9, a button is provided for each of the "large sheet" and the "middle sheet" and a lamp is provided for each of the sheet sizes respectively included in the "large sheet" and the "middle sheet". Meanwhile, in the example illustrated in FIG. 5, since an option for the sheet size is small compared to the example illustrated in FIG. 9, the number of the lamps or the buttons can be limited. Accordingly, it is possible to suppress an increase in cost due to an increase in size of the apparatus or an increase in number of the components.

According to the above-described embodiment, the size of the sheet set on the sheet feeding tray of the printing apparatus is determined by the operation of the user and the detection result obtained by the sensor. Accordingly, the size of the sheet can be appropriately determined.

In addition, when the host device transmits a print job having a sheet size which is different from the sheet size determined as described above, this difference can be expressed by a combination of lightning od the lamps on the operation panels. Accordingly, an operation of canceling or continuing the printing process can be appropriately and fast performed by the user.

With such a configuration, for example, even when an LCD or a touch panel is not provided in the printing apparatus, the sheet can be switched by operations of the lamps and the buttons. Further, since the sheet size which is finally determined for each determination of the sensor is stored in the printing apparatus, the number of times of operating the button can be decreased.

Additionally, according to the above-described embodiments, the print sheet to be used for the printing process has been described as the sheet of which the size needs to be determined, but the invention is not limited thereto. For example, the size of the document read by the scanner 920 may be determined.

Further, the sheet size determining apparatus of the embodiment has been described by exemplifying the printing apparatus, but the invention is not limited thereto. For example, an external device connected to the printing apparatus or the scanner may serve as the sheet size determining apparatus which determines the size of the sheet set on the printing apparatus or the size of the sheet set on the scanner. In that case, the sheet size can be determined in such a manner that the detection result of the sensor provided in the printing apparatus or the scanner is acquired and setting information of the operation panel provided in the printing apparatus or the scanner serving as an external operation device is acquired.

Further, in the above-described embodiments, the size of the sheet set on the sheet feeding tray provided at the rear face of the printing apparatus is determined, but the invention is not limited thereto. The size of the sheet provided at the lower portion of the printing apparatus may be determined or the size of the sheet fed to the printing apparatus may be determined. In the latter case, for example, when a sensor is provided on the carriage equipped with the print head 931 and a plurality of candidate sheet sizes are detected by the sensor, the sheet size may be specified uniquely in response to the content selected in the panel as in the above-described embodiments.

Additionally, the function of the embodiment can be also realized by the following configuration. That is, the function of the embodiment can be also realized in such a manner that a program code for executing the process of the embodiment is supplied to a system or an apparatus and a computer (or a CPU or MPU) of the system or the apparatus executes the program code. In this case, the program code read out from a storage medium realizes the function of the above-described embodiments and the storage medium storing the program code also realizes the function of the embodiment.

Further, the program code for realizing the function of the embodiment may be executed by one computer (CPU, MPU) or may be executed by a cooperation of a plurality of computers. Further, the program code may be executed by a computer or hardware such as a circuit for realizing a function of the program code may be provided. Alternatively, a part of the program code may be realized by hardware and the rest thereof may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-042868 filed Mar. 4, 2016, which is hereby incorporated by reference wherein in its entirety.

What is claimed is:

1. A sheet size determining apparatus comprising:
at least one processor;
a sensor mechanism which detects a candidate size group, among a first candidate size group and a second candidate size group, of a sheet set on the sheet size determining apparatus;
an operation mechanism on which a user designates a sheet size in each of the first candidate size group and the second candidate size group,
wherein the operation mechanism indicates a first indicated group which includes a size in the first candidate size group and a size in the second candidate size group, and indicates a second indicated group which includes another size in the first candidate size group and another size in the second candidate size group, and the operation mechanism includes two lamps for the first indicated group and the second indicated group, and
wherein the designation of the sheet size for each of the first candidate size group and the second candidate size group is performed on the operation mechanism by a selection of the first indicated group or the second indicated group; and
a memory which stores a first sheet size designated on the operation mechanism for the first candidate size group and a second sheet size designated on the operation mechanism for the second candidate size group,
wherein the at least one processor stores the first sheet size on the memory, regardless of the second sheet size stored for the second candidate size group on the memory, wherein the at least one processor determines, as a sheet size of the sheet set on the sheet size determining apparatus, a current sheet size which is included in the candidate size group detected by the sensor mechanism and is stored on the memory for the detected candidate size group, and wherein, based on a determination that the sheet size which is designated by a print job does not correspond to the current sheet size, the operation mechanism operates a lamp corresponding to an indicated group which includes the sheet size designated by the print job.

2. The sheet size determining apparatus according to claim 1,
wherein the operation mechanism includes a switching button, and
wherein a sheet size group selected by the selection from the first indicated group and the second indicated group is switched by the switching button.

3. The sheet size determining apparatus according to claim 1, wherein the sensor mechanism includes a plurality of sensors and detects the candidate size group based on whether or not each of the plurality of sensors detects the sheet set on the sheet size determining apparatus.

4. The sheet size determining apparatus according to claim 2,
wherein the operation mechanism emphasizes an indicated group out of the first indicated group and the second indicated group which includes a sheet size stored on the memory for the candidate size group detected by the sensor mechanism, and
wherein, in a case where the switching button is operated when the operation mechanism emphasizes the indicated group, the at least one processor determines another sheet size in the candidate size group detected by the sensor mechanism, as the current sheet size.

5. The sheet size determining apparatus according to claim 4, wherein, in a case where the switching button is operated when the operation mechanism emphasizes the indicated group, the at least one processor stores the another sheet size on the memory, for the candidate size group detected by the sensor mechanism.

6. The sheet size determining apparatus according to claim 4, wherein, in a case where the switching button is operated when the operation mechanism emphasizes the indicated group, the operation mechanism emphasizes another indicated group.

7. The sheet size determining apparatus according to claim 4,
wherein the operation mechanism emphasizes an indicated group, by turning on a lamp corresponding to the indicated group.

8. The sheet size determining apparatus according to claim 4, wherein in a case where the sensor mechanism detects that a sheet is set on the sheet size determining apparatus, the operation mechanism emphasizes an indicated group.

9. The sheet size determining apparatus according to claim 1, wherein when it is determined that the sheet size which is designated by the print job does not correspond to the current sheet size, the operation mechanism makes a lamp corresponding to the indicated group which includes the sheet size designated by the print job, to blink.

10. A printing apparatus comprising:
at least one processor;
a sensor mechanism which detects a candidate size group, among a first candidate size group and a second candidate size group, of a sheet set on the printing apparatus;
an operation mechanism on which a user designates a sheet size in each of the first candidate size group and the second candidate size group,
wherein the operation mechanism indicates a first indicated group which includes a size in the first candidate size group and a size in the second candidate size group, and indicates a second indicated group which includes another size in the first candidate size group and another size in the second candidate size group, and the operation mechanism includes two lamps for the first indicated group and the second indicated group, and
wherein the designation of the sheet size for each of the first candidate size group and the second candidate size group is performed on the operation mechanism by a selection of the first indicated group or the second indicated group;
a memory which stores a first sheet size designated on the operation mechanism for the first candidate size group and a second sheet size designated on the operation mechanism for the second candidate size group; and
a printing mechanism which prints an image on the sheet set on the printing apparatus,
wherein the at least one processor stores the first sheet size on the memory, regardless of the second sheet size stored for the second candidate size group on the memory,
wherein the at least one processor determines, as a sheet size of the sheet set on the printing apparatus, a current sheet size which is included in the candidate size group detected by the sensor mechanism and is stored on the memory for the detected candidate size group, and
wherein, in a case where a print job to which a sheet size is designated is received by the printing apparatus, the at least one processor determines whether or not the sheet size which is designated by the print job corresponds to the current sheet size,
wherein, in a case where it is determined that the sheet size which is designated by the print job corresponds to the current sheet size, the printing mechanism print an image corresponding to the print job, and
wherein, based on a determination that the sheet size which is designated by the print job does not correspond to the current sheet size, the operation mechanism operates a lamp corresponding to an indicated group which includes the sheet size designated by the print job.

11. The printing apparatus according to claim 10,
wherein the operation mechanism includes a switching button, and
wherein a sheet size group selected by the selection from the first indicated group and the second indicated group is switched by the switching button.

12. The printing apparatus according to claim 11,
wherein the operation mechanism emphasizes an indicated group out of the first indicated group and the second indicated group which includes a sheet size stored in the memory for the candidate size group detected by the sensor mechanism, and
wherein, in a case where the switching button is operated when the operation mechanism emphasizes the indicated group, the at least one processor determines another sheet size in the candidate size group detected by the sensor mechanism, as the current sheet size.

13. The printing apparatus according to claim 12, wherein, in a case where the switching button is operated when the operation mechanism emphasizes the indicated group, the at least one processor stores the another sheet size on the memory, for the candidate size group detected by the sensor mechanism.

14. The printing apparatus according to claim 12, wherein, in a case where the switching button is operated when the operation mechanism emphasizes the indicated group, the operation mechanism emphasizes another indicated group.

15. The printing apparatus according to claim 12, wherein the operation mechanism emphasizes an indicated group, by turning on a lamp corresponding to the indicated group.

16. The printing apparatus according to claim 15, wherein, when it is determined that the sheet size which is designated by the print job does not correspond to the current sheet size, the operation mechanism makes a lamp corresponding to the indicated group which includes the sheet size designated by the print job, to blink.

17. The printing apparatus according to claim 16, wherein the operation mechanism continues to make the lamp to blink, regardless of an operation to the switching button.

18. The printing apparatus according to claim 10, wherein the sensor mechanism includes a plurality of sensors and detects the candidate size group based on whether or not each of the plurality of sensors detects the sheet set on the printing apparatus.

19. The printing apparatus according to claim 10, wherein, in a case where it is determined that the sheet size which is designated by the print job is smaller than the sheet size of the sheet set on the printing apparatus, the printing mechanism prints an image having a size corresponding to the sheet size designated by the print job.

20. A sheet size determining method by an apparatus which comprises at least one processor, a sensor mechanism which detects a candidate size group, among a first candidate size group and a second candidate size group, of a sheet set on the apparatus, an operation mechanism on which a user designates a sheet size in each of the first candidate size group and the second candidate size group, and a memory which stores a first sheet size designated on the operation mechanism for the first candidate size group and a second sheet size designated on the operation mechanism for the second candidate size group, the method comprising:
storing, by the at least one processor, the first sheet size on the memory, regardless of the second sheet size stored for the second candidate size group on the memory;
determining, by the at least one processor, as a sheet size of the sheet set on the apparatus, a current sheet size which is included in the candidate size group detected by the sensor mechanism and is stored on the memory for the detected candidate size group,
wherein the operation mechanism indicates a first indicated group which includes a size in the first candidate size group and a size in the second candidate size group, and indicates a second indicated group which includes another size in the first candidate size group and another size in the second candidate size group, and the operation mechanism includes two lamps for the first indicated group and the second indicated group, designating the sheet size for each of the first candidate size group and the second candidate size group on the operation mechanism by a selection of the first indicated group or the second indicated group, and
wherein, based on a determination that the sheet size which is designated by a print job does not correspond to the current sheet size, the operation mechanism operates a lamp corresponding to an indicated group which includes the sheet size designated by the print job.

21. A sheet size determining apparatus comprising:
at least one processor;
a sensor mechanism which detects a candidate size group, among a first candidate size group and a second candidate size group, of a sheet set on the sheet size determining apparatus;
an operation mechanism on which a user designates a sheet size in each of the first candidate size group and the second candidate size group,
wherein the operation mechanism indicates a first indicated group which includes a size in the first candidate size group and a size in the second candidate size group, and indicates a second indicated group which includes another size in the first candidate size group and another size in the second candidate size group, and the operation mechanism includes two lamps for the first indicated group and the second indicated group, and
wherein a selection of the first indicated group or the second indicated group is performed on the operation mechanism; and
wherein the at least one processor determines, as a sheet size of the sheet set on the sheet size determining apparatus, a current sheet size which is included in the candidate size group detected by the sensor mechanism and an indicated group selected on the operation mechanism from the first indicated group and the second indicated group, and
wherein, based on a determination that the sheet size which is designated by the print job does not correspond to the current sheet size, the operation mechanism operates a lamp corresponding to an indicated group which includes the sheet size designated by the print job.

22. The sheet size determining apparatus according to claim 21,
wherein if a sheet of any size in the first candidate size group is set on the sheet size determining apparatus, a result of detection by the sensor mechanism is the same and the first candidate size group is detected, and
if a sheet of any size in the second candidate size group is set on the sheet size determining apparatus, a result of detection by the sensor mechanism is the same and the second candidate size group is detected.

23. The sheet size determining apparatus according to claim 21, wherein when it is determined that the sheet size which is designated by the print job does not correspond to the current sheet size, the operation mechanism makes a lamp corresponding to the indicated group which includes the sheet size designated by the print job, to blink.

24. The sheet size determining apparatus according to claim 21,
wherein the first indicated group includes letter size in the first candidate size group and 4×6 size in the second candidate size group, and the second indicated group includes A4 size in the first candidate size group and hagaki size in the second candidate size group.

* * * * *